(12) United States Patent
Wang et al.

(10) Patent No.: US 12,413,661 B2
(45) Date of Patent: Sep. 9, 2025

(54) DISPLAY CONTROL METHOD AND APPARATUS

(71) Applicant: Huawei Technologies Co., Ltd., Shenzhen (CN)

(72) Inventors: Dawei Wang, Shenzhen (CN); Jiejing Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 17/922,250

(22) PCT Filed: Apr. 15, 2021

(86) PCT No.: PCT/CN2021/087587
§ 371 (c)(1),
(2) Date: Oct. 28, 2022

(87) PCT Pub. No.: WO2021/218652
PCT Pub. Date: Nov. 4, 2021

(65) Prior Publication Data
US 2023/0188640 A1 Jun. 15, 2023

(30) Foreign Application Priority Data
Apr. 30, 2020 (CN) .......................... 202010366208.0

(51) Int. Cl.
*H04M 1/72454* (2021.01)
*G06F 3/044* (2006.01)
(Continued)

(52) U.S. Cl.
CPC ........ *H04M 1/72454* (2021.01); *G06F 3/044* (2013.01); *G06V 40/161* (2022.01);
(Continued)

(58) Field of Classification Search
CPC ............. H04M 1/72454; H04M 1/605; H04M 2250/12; H04M 2250/52; G06F 3/044;
(Continued)

(56) References Cited

U.S. PATENT DOCUMENTS 10,360,876 B1 * 7/2019 Rahman .................... G09G 5/14
2002/0167488 A1 * 11/2002 Hinckley .............. G06F 1/1684
345/173
(Continued)

FOREIGN PATENT DOCUMENTS

CN 102769689 B 3/2015
CN 105549721 A 5/2016
(Continued)

*Primary Examiner* — Christopher E Leiby
(74) *Attorney, Agent, or Firm* — Conley Rose, P.C.

(57) ABSTRACT

A display control method applied to a mobile terminal, which includes a display and is coupled to an external device, includes when the mobile terminal is on a voice call, using the external device; determining that the mobile terminal is in a handheld state or a non-handheld state; when the mobile terminal is in the handheld state, controlling the display to be in a screen-on state; and when the mobile terminal is in the non-handheld state, controlling the display to be in a screen-off state.

20 Claims, 9 Drawing Sheets

(51) Int. Cl.
*G06V 40/16* (2022.01)
*G09G 5/10* (2006.01)
*H04W 52/02* (2009.01)

(52) U.S. Cl.
CPC ............ *G09G 5/10* (2013.01); *H04W 52/027* (2013.01); *G09G 2354/00* (2013.01); *G09G 2360/144* (2013.01); *H04M 2250/12* (2013.01); *H04M 2250/52* (2013.01)

(58) Field of Classification Search
CPC ........ G06F 3/013; G06V 40/161; G09G 5/10; G09G 2354/00; G09G 2360/144; H04W 52/027; H04W 52/0251; H04W 52/0267; Y02D 30/70
See application file for complete search history.

(56) References Cited

U.S. PATENT DOCUMENTS

| | | | | |
|---|---|---|---|---|
| 2009/0023422 | A1* | 1/2009 | MacInnis | H04L 63/0861 455/411 |
| 2009/0082066 | A1* | 3/2009 | Katz | H04N 23/611 455/566 |
| 2011/0003615 | A1* | 1/2011 | Langereis | G01S 15/04 455/556.1 |
| 2012/0015672 | A1 | 1/2012 | Jung | |
| 2012/0094714 | A1* | 4/2012 | Yoshikawa | H04M 1/72454 455/556.1 |
| 2014/0187226 | A1 | 7/2014 | Cui | |
| 2015/0185265 | A1* | 7/2015 | McCarthy | G06F 3/01 702/150 |
| 2015/0300833 | A1* | 10/2015 | van Os | H04M 1/72403 345/694 |
| 2016/0100051 | A1* | 4/2016 | Yliaho | H04M 1/57 455/415 |
| 2017/0048382 | A1* | 2/2017 | Watanabe | H04M 1/72454 |
| 2017/0063852 | A1* | 3/2017 | Azar | G06V 40/70 |
| 2018/0005605 | A1* | 1/2018 | Kolli | G06F 1/1626 |
| 2020/0160813 | A1* | 5/2020 | Aurongzeb | G09G 3/36 |
| 2020/0374386 | A1 | 11/2020 | Xu | |
| 2021/0120204 | A1* | 4/2021 | Senapati | H04N 23/695 |
| 2021/0264563 | A1* | 8/2021 | Shen | A63F 13/55 |
| 2021/0397291 | A1* | 12/2021 | Pantfoerder | G06F 3/04182 |
| 2022/0156485 | A1* | 5/2022 | Tzvieli | G06F 3/013 |

FOREIGN PATENT DOCUMENTS

| | | |
|---|---|---|
| CN | 104410751 B | 9/2016 |
| CN | 107566643 A | 1/2018 |
| CN | 108390996 A | 8/2018 |
| CN | 108418953 A | 8/2018 |
| CN | 108777748 A | 11/2018 |
| CN | 109195213 A | 1/2019 |
| CN | 110753155 A | 2/2020 |
| WO | 2019100298 A1 | 5/2019 |

* cited by examiner

DISPLAY CONTROL METHOD AND APPARATUS

CROSS-REFERENCE TO RELATED APPLICATIONS

This is a U.S. National Stage of International Patent Application No. PCT/CN2021/087587 filed on Apr. 15, 2021, which claims priority to Chinese Patent Application No. 202010366208.0 filed on Apr. 30, 2020, both of which are hereby incorporated by reference in their entireties.

TECHNICAL FIELD

This application relates to the field of mobile terminal technologies, and more specifically, to a display control method and an apparatus.

BACKGROUND

Currently, a distance sensor is installed on a smartphone, and the distance sensor can detect whether an object exists within a specific distance in front of the smartphone. When the smartphone receives an incoming call, the smartphone turns on a display to display information such as a calling party and an incoming call number. When a user answers the incoming call, and picks up the smartphone close to an ear, the distance sensor on the smartphone detects that an object exists within a specific distance in front of the smartphone, and the smartphone turns off the display based on a detection result of the distance sensor.

When the smartphone is connected to a Bluetooth headset in advance and the smartphone receives an incoming call, the smartphone disables the distance sensor, and turns on the display to display information such as a calling party and an incoming call number. When the user answers the incoming call, the user usually performs the voice call by using the Bluetooth headset, the display continues to keep in a screen-on state, and the display automatically turns off only when an automatic screen-off time of the display expires. If the user does not need to watch the display after answering the incoming call, keeping the display in the screen-on state is meaningless, and it also means that power of the display is wasted.

To solve the foregoing problem, the conventional technology uses the following method: It is determined whether the smartphone is in a power saving mode and is connected to a Bluetooth device. If yes, an application, a mobile phone ringtone, and the display of the smartphone are disabled. If the smartphone receives an incoming call, the smartphone does not turn on the display, but the Bluetooth device performs reminding, thereby saving power of the smartphone.

However, when the smartphone is connected to a Bluetooth device and the smartphone receives an incoming call, sometimes the user needs to watch the display of the smartphone, and sometimes the user does not need to watch the display of the smartphone. Therefore, the conventional technology cannot meet requirements of the user in a plurality of scenarios.

SUMMARY

This application provides a display control method and an apparatus. When a mobile terminal is connected to an external device and the mobile terminal receives an incoming call, it may be determined, based on whether the mobile terminal is in a handheld state, that a display is in a screen-on state or a screen-off state, to meet requirements of a user in a plurality of scenarios.

According to a first aspect, an embodiment of this application provides a display control method. The method is applied to a mobile terminal, the mobile terminal includes a display, the mobile terminal is connected to an external device, and the method includes: when the mobile terminal is on a voice call by using the external device, determining that the mobile terminal is in a handheld state or a non-handheld state; and when the mobile terminal is in the handheld state, controlling the display to be in a screen-on state; or when the mobile terminal is in the non-handheld state, controlling the display to be in a screen-off state.

In the first aspect, when the mobile terminal is on the voice call by using the external device, a display control solution is intelligently selected by determining that the mobile terminal is in the handheld state or the non-handheld state, to meet requirements in different use scenarios, and further save power of the display.

In a possible implementation of the first aspect, the display includes a capacitance sensor, and the determining that the mobile terminal is in a handheld state or a non-handheld state includes: detecting, by using the capacitance sensor, whether the display is touched; and when the display is touched, determining that the mobile terminal is in the handheld state; or when the display is not touched, determining that the mobile terminal is in the non-handheld state.

In a possible implementation of the first aspect, the mobile terminal further includes a temperature sensor, and the determining that the mobile terminal is in a handheld state or a non-handheld state includes: collecting, by using the temperature sensor, a skin temperature or a shell temperature of a human body in contact with the mobile terminal; and when a temperature value of the temperature sensor falls within a first temperature range, determining that the mobile terminal is in the handheld state; or when a temperature value of the temperature sensor falls outside the first temperature range, determining that the mobile terminal is in the non-handheld state.

The temperature sensor may be disposed at a position at which a user may hold the mobile terminal. The first temperature range may be flexibly preset based on an actual situation. It may be determined, by using the temperature sensor on the mobile terminal, whether the mobile terminal is in the handheld state or the non-handheld state.

In a possible implementation of the first aspect, the mobile terminal further includes an acceleration sensor, and the determining that the mobile terminal is in a handheld state or a non-handheld state includes: determining, based on the acceleration sensor, that the mobile terminal is in the handheld state or the non-handheld state.

In a possible implementation of the first aspect, the determining, based on the acceleration sensor, that the mobile terminal is in the handheld state or the non-handheld state includes: determining a motion parameter of the acceleration sensor in a first time period; and when the motion parameter of the acceleration sensor conforms to a handheld condition, determining that the mobile terminal is in the handheld state; or when the motion parameter of the acceleration sensor does not conform to a handheld condition, determining that the mobile terminal is in the non-handheld state.

If a user holds the mobile terminal, the mobile terminal is usually in a specific posture, so that the display of the mobile terminal can conform to a watching angle of the user. The handheld condition may be set based on all postures in which the user may hold the mobile terminal.

If the user needs to watch the display of the mobile terminal, the user picks up the mobile terminal. In a process in which the user picks up the mobile terminal, motion parameters such as an acceleration, an angle, and a speed of the mobile terminal all change. Changes of the motion parameters may be identified by using the acceleration sensor of the mobile terminal, to determine whether the motion parameters of the acceleration sensor conform to the handheld state or the non-handheld state.

In a possible implementation of the first aspect, the mobile terminal further includes a camera, and before the controlling the display to be in a screen-on state, the method further includes: determining whether the camera captures a face image; and when the camera captures the face image, performing the step of controlling the display to be in the screen-on state; or when the camera fails to capture the face image, controlling the display to be in the screen-off state.

When the mobile terminal is on the voice call by using the external device and the mobile terminal is in the handheld state, the display control solution is intelligently selected by determining whether the camera captures the face image, to meet requirements of the user in different scenarios.

In a possible implementation of the first aspect, the mobile terminal further includes a camera, and before the controlling the display to be in a screen-off state, the method further includes: determining whether the camera captures a face image; and when the camera captures the face image, controlling the display to be in the screen-on state; or when the camera fails to capture the face image, performing the step of controlling the display to be in the screen-off state.

When the mobile terminal is on the voice call by using the external device and the mobile terminal is in the non-handheld state, the display control solution is intelligently selected by determining whether the camera captures the face image, to meet requirements of the user in different scenarios.

In a possible implementation of the first aspect, the mobile terminal further includes an ambient light sensor, and before the controlling the display to be in a screen-on state, the method further includes: determining, based on the ambient light sensor, whether light luminance of an ambient environment of the mobile terminal is greater than or equal to a luminance threshold; and when the light luminance of the ambient environment of the mobile terminal is greater than or equal to the luminance threshold, determining, based on the ambient light sensor, that the display is in the screen-on state or the screen-off state; or when the light luminance of the ambient environment of the mobile terminal is less than the luminance threshold, performing the step of controlling the display to be in the screen-on state.

When the mobile terminal is on the voice call by using the external device and the mobile terminal is in the handheld state, the display control solution is intelligently selected by determining whether the light luminance of the ambient environment of the mobile terminal is greater than or equal to the luminance threshold. When the light luminance of the ambient environment of the mobile terminal is greater than or equal to the luminance threshold, it indicates that the user is in a bright environment, and it may be determined, based on the ambient light sensor, that the display is in the screen-on state or the screen-off state. When the light luminance of the ambient environment of the mobile terminal is less than the luminance threshold, it indicates that the user is in a dark environment, and the display may be controlled to be in the screen-on state, so that the display illuminates the ambient environment of the user.

In a possible implementation of the first aspect, the mobile terminal further includes an ambient light sensor, and before the controlling the display to be in a screen-off state, the method further includes: determining, based on the ambient light sensor, whether light luminance of an ambient environment of the mobile terminal is greater than or equal to a luminance threshold; and when the light luminance of the ambient environment of the mobile terminal is greater than or equal to the luminance threshold, performing the step of controlling the display to be in the screen-off state; or when the light luminance of the ambient environment of the mobile terminal is less than the luminance threshold, controlling the display to be in the screen-on state.

When the mobile terminal is on the voice call by using the external device and the mobile terminal is in the non-handheld state, the display control solution is intelligently selected by determining whether the light luminance of the ambient environment of the mobile terminal is greater than or equal to the luminance threshold. When the light luminance of the ambient environment of the mobile terminal is greater than or equal to the luminance threshold, it indicates that the user is in a bright environment, and the user does not need the display to perform illumination. It may be determined, based on the fact that the mobile terminal is in the non-handheld state, that the user does not need to watch the display, so that the mobile terminal can control the display to be in the screen-off state. When the light luminance of the ambient environment of the mobile terminal is less than the luminance threshold, it indicates that the user is in a dark environment, and although the user does not need to watch the display, the display may be controlled to be in the screen-on state, so that the display illuminates the ambient environment of the user.

According to a second aspect, an embodiment of this application provides a display control method. The method is applied to a mobile terminal, the mobile terminal includes a display and a camera, the mobile terminal is connected to an external device, and the method includes: when the mobile terminal is on a voice call by using the external device, determining whether the camera captures a face image; and when the camera captures the face image, controlling the display to be in a screen-on state; or when the camera fails to capture the face image, controlling the display to be in a screen-off state.

In the second aspect, when the mobile terminal is on the voice call by using the external device, a display control solution is intelligently selected by determining whether the camera captures the face image, to meet requirements of a user in different scenarios.

In a possible implementation of the second aspect, the mobile terminal further includes an ambient light sensor, and before the controlling the display to be in a screen-on state, the method further includes: determining, based on the ambient light sensor, whether light luminance of an ambient environment of the mobile terminal is greater than or equal to a luminance threshold; and when the light luminance of the ambient environment of the mobile terminal is greater than or equal to the luminance threshold, determining, based on the ambient light sensor, that the display is in the screen-on state or the screen-off state; or when the light luminance of the ambient environment of the mobile terminal is less than the luminance threshold, performing the step of controlling the display to be in the screen-on state.

In a possible implementation of the second aspect, the mobile terminal further includes an ambient light sensor, and before the controlling the display to be in a screen-off state, the method further includes: determining, based on the ambient light sensor, whether light luminance of an ambient environment of the mobile terminal is greater than or equal to a luminance threshold; and when the light luminance of the ambient environment of the mobile terminal is greater than or equal to the luminance threshold, performing the step of controlling the display to be in the screen-off state; or when the light luminance of the ambient environment of the mobile terminal is less than the luminance threshold, controlling the display to be in the screen-on state.

According to a third aspect, an embodiment of this application provides a mobile terminal, including a display, a memory, and a processor connected to the memory. The mobile terminal is connected to an external device, and the memory is configured to store instructions. The processor is configured to execute the instructions, so that a computer device performs the following operations: when the mobile terminal is on a voice call by using the external device, determining that the mobile terminal is in a handheld state or a non-handheld state; and when the mobile terminal is in the handheld state, controlling the display to be in a screen-on state; or when the mobile terminal is in the non-handheld state, controlling the display to be in a screen-off state.

In a possible implementation of the third aspect, the display includes a capacitance sensor; and the processor is specifically configured to: detect, by using the capacitance sensor, whether the display is touched; and when the display is touched, determine that the mobile terminal is in the handheld state; or when the display is not touched, determine that the mobile terminal is in the non-handheld state.

In a possible implementation of the third aspect, the mobile terminal further includes a temperature sensor; and the processor is specifically configured to: collect, by using the temperature sensor, a skin temperature or a shell temperature of a human body in contact with the mobile terminal; and when a temperature value of the temperature sensor falls within a first temperature range, determine that the mobile terminal is in the handheld state; or when a temperature value of the temperature sensor falls outside the first temperature range, determine that the mobile terminal is in the non-handheld state.

In a possible implementation of the third aspect, the mobile terminal further includes an acceleration sensor; and the processor is specifically configured to determine, based on the acceleration sensor, that the mobile terminal is in the handheld state or the non-handheld state.

In a possible implementation of the third aspect, the processor is specifically configured to: determine a motion parameter of the acceleration sensor in a first time period; and when the motion parameter of the acceleration sensor conforms to a handheld condition, determine that the mobile terminal is in the handheld state; or when the motion parameter of the acceleration sensor does not conform to a handheld condition, determine that the mobile terminal is in the non-handheld state.

In a possible implementation of the third aspect, the mobile terminal further includes a camera; and the processor is specifically configured to: determine whether the camera captures a face image; and When the camera captures the face image, perform the step of controlling the display to be in the screen-on state; or when the camera fails to capture the face image, control the display to be in the screen-off state.

In a possible implementation of the third aspect, the mobile terminal further includes a camera; and the processor is specifically configured to: determine whether the camera captures a face image; and when the camera captures the face image, control the display to be in the screen-on state; or when the camera fails to capture the face image, perform the step of controlling the display to be in the screen-off state.

In a possible implementation of the third aspect, the mobile terminal further includes an ambient light sensor, and the processor is specifically configured to: determine, based on the ambient light sensor, whether light luminance of an ambient environment of the mobile terminal is greater than or equal to a luminance threshold; and when the light luminance of the ambient environment of the mobile terminal is greater than or equal to the luminance threshold, determine, based on the ambient light sensor, that the display is in the screen-on state or the screen-off state; or when the light luminance of the ambient environment of the mobile terminal is less than the luminance threshold, perform the step of controlling the display to be in the screen-on state.

In a possible implementation of the third aspect, the mobile terminal further includes an ambient light sensor, and the processor is specifically configured to: determine, based on the ambient light sensor, whether light luminance of an ambient environment of the mobile terminal is greater than or equal to a luminance threshold; and when the light luminance of the ambient environment of the mobile terminal is greater than or equal to the luminance threshold, perform the step of controlling the display to be in the screen-off state; or when the light luminance of the ambient environment of the mobile terminal is less than the luminance threshold, control the display to be in the screen-on state.

According to a fourth aspect, an embodiment of this application provides a mobile terminal, including a display, a memory, and a processor connected to the memory. The mobile terminal is connected to an external device, and the memory is configured to store instructions. The processor is configured to execute the instructions, so that a computer device performs the following operations: when the mobile terminal is on a voice call by using the external device, determining whether a camera captures a face image; and when the camera captures the face image, controlling the display to be in a screen-on state; or when the camera tails to capture the face image, controlling the display to be in a screen-off state.

In a possible implementation of the fourth aspect, the mobile terminal further includes an ambient light sensor, and the processor is specifically configured to: determine, based on the ambient light sensor, whether light luminance of an ambient environment of the mobile terminal is greater than or equal to a luminance threshold; and when the light luminance of the ambient environment of the mobile terminal is greater than or equal to the luminance threshold, determine, based on the ambient light sensor, that the display is in the screen-on state or the screen-off state; or when the light luminance of the ambient environment of the mobile terminal is less than the luminance threshold, perform the step of controlling the display to be in the screen-on state.

In a possible implementation of the fourth aspect, the mobile terminal further includes an ambient light sensor, and the processor is specifically configured to: determine, based on the ambient light sensor, whether light luminance of an ambient environment of the mobile terminal is greater than or equal to a luminance threshold; and when the light luminance of the ambient environment of the mobile terminal is greater than or equal to the luminance threshold, perform the step of controlling the display to be in the screen-off state; or when the light luminance of the ambient environment of the mobile terminal is less than the luminance threshold, control the display to be in the screen-on state.

According to a fifth aspect, an embodiment of this application provides a mobile terminal, including: a first determining module, configured to: when the mobile terminal is on a voice call by using an external device, determine that the mobile terminal is in a handheld state or a non-handheld state; and a first processing module, configured to: when the mobile terminal is in the handheld state, control the display to be in a screen-on state; or when the mobile terminal is in the non-handheld state, control the display to be in a screen-off state.

According to a sixth aspect, an embodiment of this application provides a mobile terminal, including: a second determining module, configured to: when the mobile terminal is on a voice call by using an external device, determine whether a camera captures a face image; and a second processing module, configured to: when the camera captures the face image, control the display to be in a screen-on state; or when the camera fails to capture the face image, control the display to be in a screen-off state.

DESCRIPTION OF EMBODIMENTS

Figure 1:
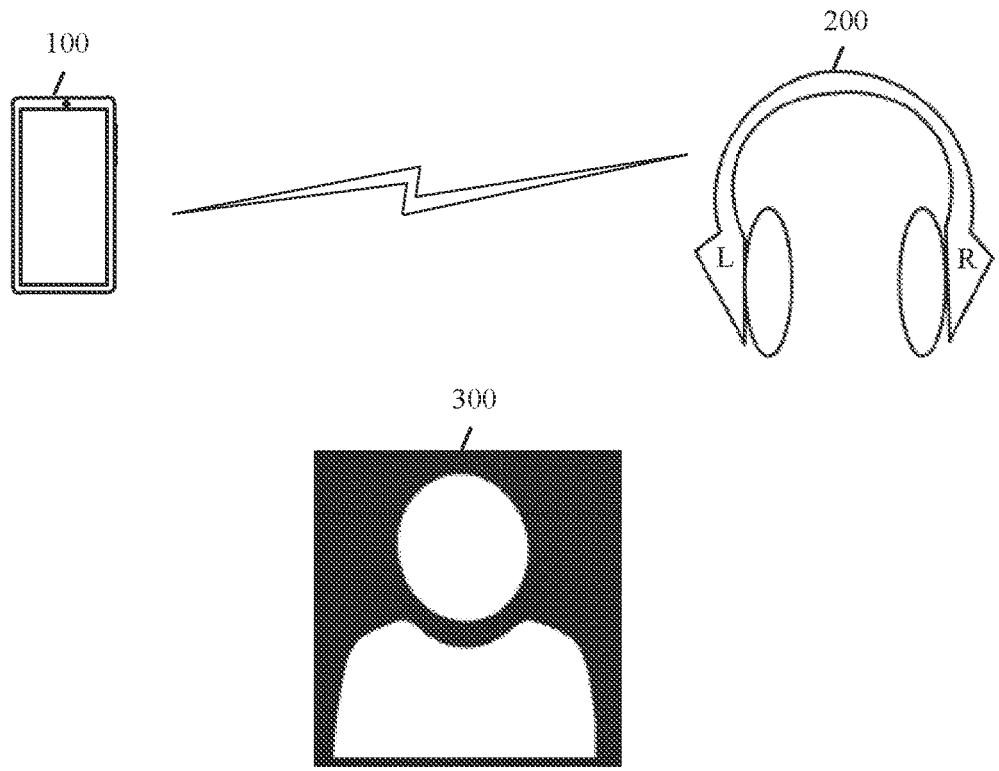
FIG. 1 is a schematic diagram of a scenario according to an embodiment of this application.

Refer to FIG. 1. FIG. 1 is a schematic diagram of a scenario according to an embodiment of this application. In the schematic diagram of the scenario shown in FIG. 1, a mobile terminal 100, a Bluetooth headset 200, and a user 300 are displayed. The mobile terminal 100 shown in FIG. 1 can perform a display control method provided in embodiments of this application, and the mobile terminal 100 can make a voice call by using the Bluetooth headset 200. Optionally, the mobile terminal 101 includes but is not limited to a smartphone, a palmtop computer, a tablet, and the like.

With reference to FIG. 1, in a possible scenario, the user 300 connects the mobile terminal 100 to the Bluetooth headset 200 by using Bluetooth, and the user 300 wears the Bluetooth headset 200 on ears. It is assumed that the user 300 establishes a voice communication connection to a terminal device of another user by using the mobile terminal 100, and performs a voice call by using the Bluetooth headset 200. Then, the display control method provided in embodiments of this application may be used to determine, based on whether the mobile terminal 100 is in a handheld state, whether a display of the mobile terminal 100 is in a screen-on state or a screen-off state, to meet requirements of the user 300 in a plurality of scenarios.

Figure 2:
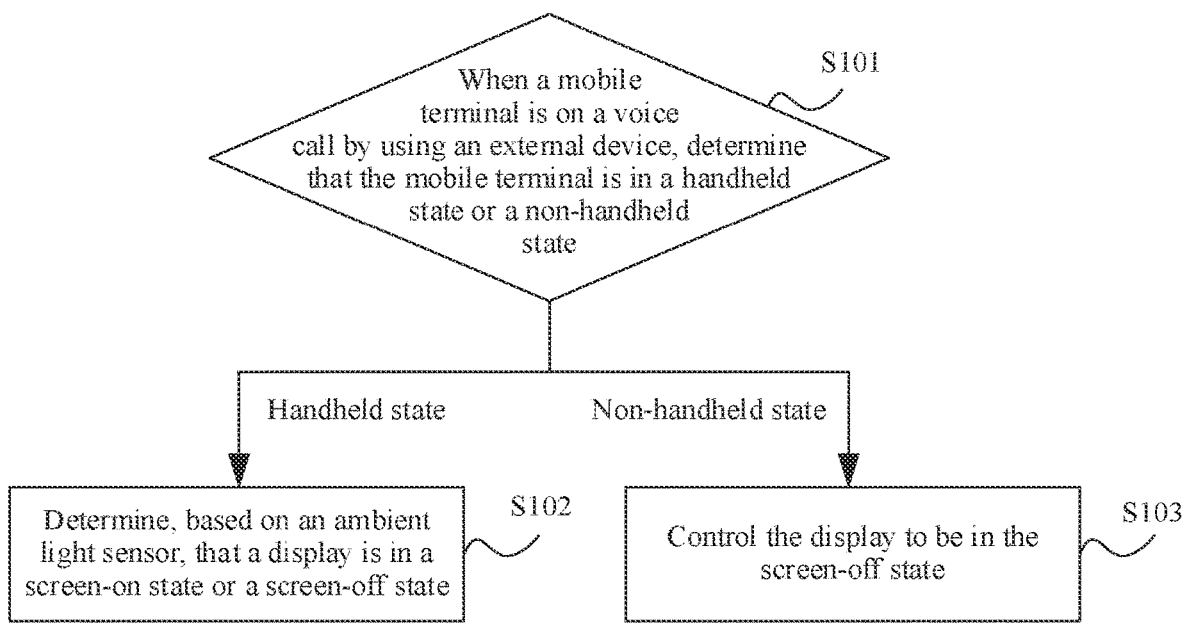
FIG. 2 is a flowchart of a display control method according to an embodiment of this application.

Refer to FIG. 2. FIG. 2 is a flowchart of a display control method according to an embodiment of this application. The display control method shown in FIG. 2 may be applied to a mobile terminal, the mobile terminal includes a display, and the mobile terminal is connected to an external device. The method shown in FIG. 2 includes the following steps S101 to S103.

S101: When the mobile terminal is on a voice call by using the external device, determine that the mobile terminal is in a handheld state or a non-handheld state. If the mobile terminal is in the handheld state, S102 is performed; or if the mobile terminal is in the non-handheld state, S103 is performed.

The handheld state means that a user holds the mobile terminal by hand. For example, the handheld state may be that the user holds the mobile terminal with one hand, or may be that the user holds the mobile terminal with two hands.

The non-handheld state means that the user does not hold the mobile terminal by hand. For example, the non-handheld state may be that the mobile terminal is placed on a table, and the hand of the user does not touch the mobile terminal.

The external device may be an electronic device such as a Bluetooth headset, a Bluetooth speaker, or a wired headset, and the external device needs to have a voice call function.

For example, with reference to FIG. 1, the user 300 wears the Bluetooth headset 200, and the user 300 connects the mobile terminal 100 to the Bluetooth headset 200 by using Bluetooth. When the mobile terminal 100 is on a voice call by using the Bluetooth headset 200, it needs to be determined whether the mobile terminal 100 is held by the user 300 by hand. If yes, it may be determined that the mobile terminal 100 is in the handheld state. Otherwise, it may be determined that the mobile terminal 100 is in the non-handheld state. Because there are a plurality of manners of determining whether the mobile terminal 100 is in the handheld state or the non-handheld state, details are described in the following embodiments.

Optionally, voice call software is pre-installed in the mobile terminal, and the mobile terminal may make a voice call with another terminal device by using the voice call software. In addition, the voice call software of the mobile terminal may monitor information such as a status and duration of a voice call. The mobile terminal may determine, based on the voice call software, whether the mobile terminal is currently in a voice call state.

Optionally, in S101, if the display of the mobile terminal includes a capacitance sensor, the determining that the mobile terminal is in a handheld state or a non-handheld state may include the following steps: detecting, by using the capacitance sensor, whether the display is touched; and when the display is touched, determining that the mobile terminal is in the handheld state; or when the display is not touched, determining that the mobile terminal is in the non-handheld state.

When the user holds the mobile terminal by hand, if the hand of the user touches the display of the mobile terminal, the capacitance sensor of the display may sense the touch.

Therefore, whether the display is touched may be detected by using the capacitance sensor of the display.

Optionally; in S101, if the mobile terminal further includes a temperature sensor, and the determining that the mobile terminal is in a handheld state or a non-handheld state may include the following steps: first, collecting, by using the temperature sensor, a skin temperature or a shell temperature of a human body in contact with the mobile terminal; and when a temperature value of the temperature sensor falls within a first temperature range, determining that the mobile terminal is in the handheld state; or when a temperature value of the temperature sensor falls outside the first temperature range, determining that the mobile terminal is in the non-handheld state.

The temperature sensor may be disposed at a position at which the user may hold the mobile terminal. For example, the temperature sensor is disposed on an internal surface of a housing of the mobile terminal. When the user holds the housing of the mobile terminal, the housing transfers heat to the temperature sensor on the internal surface of the housing through heat conduction. For another example, the temperature sensor is disposed on an external surface of the housing of the mobile terminal. When the user holds the housing of the mobile terminal, the temperature sensor on the housing may directly collect the skin temperature or the shell temperature of the human body in contact with the mobile terminal. Because a normal temperature range of the human body is usually between 36 degrees and 37 degrees, the first temperature range may be set to 36 degrees to 37 degrees. Certainly, considering different environments and statuses in which the user is located, a temperature at which the user holds the mobile terminal may fluctuate, and the first temperature range may also be set to 34 degrees to 40 degrees. The first temperature range may be flexibly preset based on an actual situation. It may be determined, by using the temperature sensor on the mobile terminal, whether the mobile terminal is in the handheld state or the non-handheld state.

Optionally, in S101, if the mobile terminal further includes an acceleration sensor, and the determining that the mobile terminal is in a handheld state or a non-handheld state includes the following step: determining, based on the acceleration sensor, that the mobile terminal is in the handheld state or the non-handheld state. Specifically, first, a motion parameter of the acceleration sensor in a first time period is determined. When the motion parameter of the acceleration sensor conforms to a handheld condition, it is determined that the mobile terminal is in the handheld state. When the motion parameter of the acceleration sensor does not conform to a handheld condition, it is determined that the mobile terminal is in the non-handheld state.

If the user holds the mobile terminal, the mobile terminal is usually in a specific posture, so that the display of the mobile terminal can conform to a watching angle of the user. The handheld condition may be set based on all postures in which the user may hold the mobile terminal.

For example, when the user holds a smartphone, all possible postures of the smartphone may be recorded in advance by using the acceleration sensor. The posture means a flip angle of the smartphone. Then, the smartphone uses all the possible postures of the smartphone as the handheld condition. In a scenario in which the user normally uses the smartphone, it is determined, by using the acceleration sensor, whether a motion parameter of the smartphone conforms to a preset handheld condition is determined. If yes, it indicates that the user is holding the smartphone. Otherwise, it indicates that the user does not hold the smartphone.

If the user needs to watch the display of the mobile terminal, the user picks up the mobile terminal. In a process in which the user picks up the mobile terminal, motion parameters such as an acceleration, an angle, and a speed of the mobile terminal all change. Changes of the motion parameters may be identified by using the acceleration sensor of the mobile terminal, to determine whether the motion parameters of the acceleration sensor conform to the handheld state or the non-handheld state.

In the solution provided in this embodiment of this application, it may be determined, by using the acceleration sensor on the mobile terminal, whether the mobile terminal is in the handheld state or the non-handheld state.

S102: Control the display to be in the screen-on state.

When the mobile terminal is in the handheld state, it indicates that the user may need to watch the display, so that the mobile terminal can control the display to be in the screen-on state.

S103: Control the display to be in the screen-off state.

When the mobile terminal is in the non-handheld state, it indicates that the user does not need to watch the display, so that the mobile terminal can control the display to be in the screen-off state.

In the embodiment shown in FIG. 2, when the mobile terminal is on a voice call by using the external device, a display control solution is intelligently selected by determining that the mobile terminal is in the handheld state or the non-handheld state, to meet requirements in different use scenarios, and further save power of the display.

Figure 3:
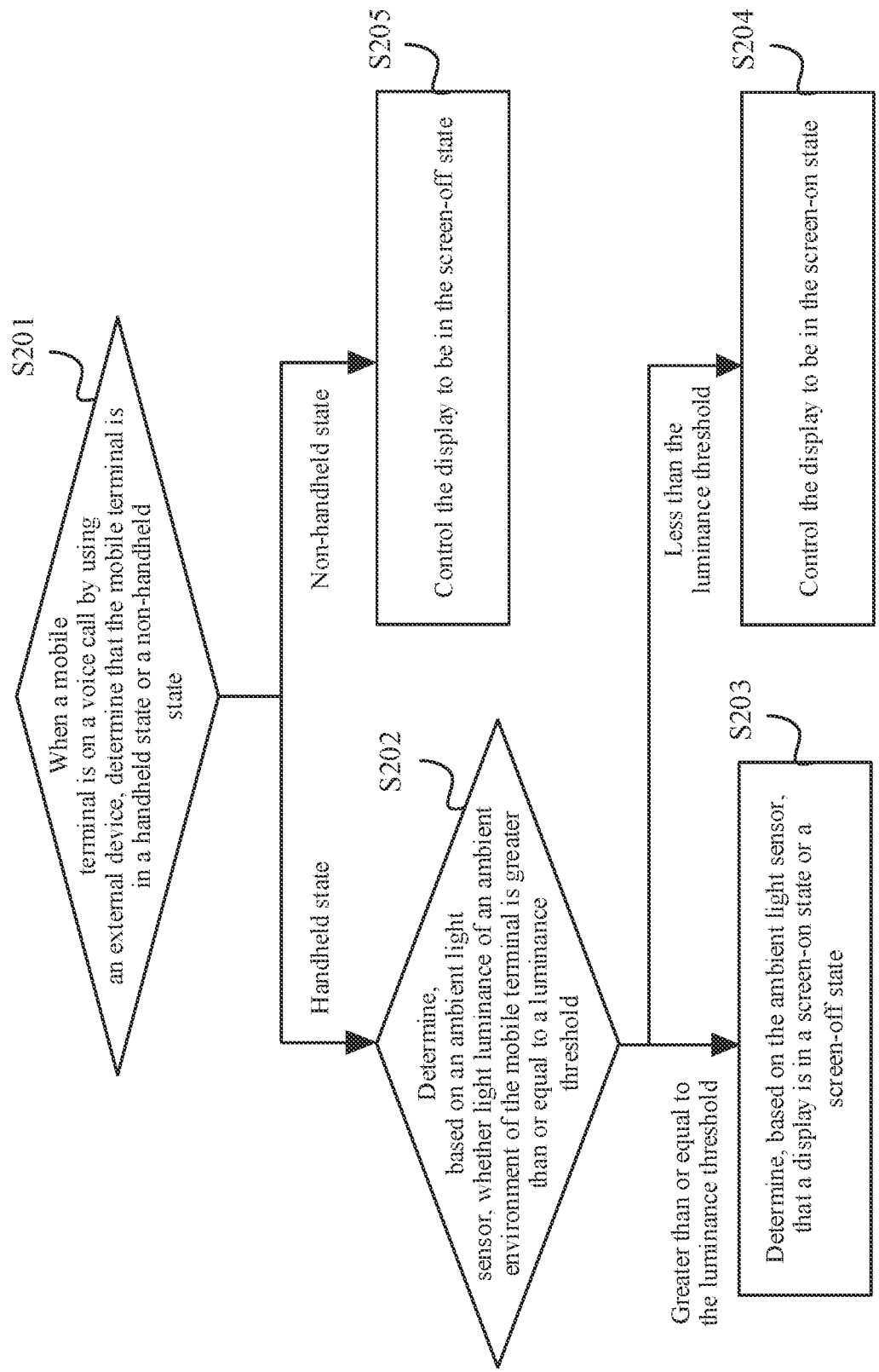
FIG. 3 is a flowchart of another display control method according to an embodiment of this application.

Refer to FIG. 3. FIG. 3 is a flowchart of another display control method according to an embodiment of this application. The display control method shown in FIG. 3 may be applied to a mobile terminal, the mobile terminal includes a display and an ambient light sensor, and the mobile terminal is connected to an external device. The method shown in FIG. 3 includes the following steps S201 to S205.

S201: When the mobile terminal is on a voice call by using the external device, determine that the mobile terminal is in a handheld state or a non-handheld state. If the mobile terminal is in the handheld state, S202 is performed; or if the mobile terminal is in the non-handheld state, S205 is performed.

The handheld state means that a user holds the mobile terminal by hand. For example, the handheld state may be that the user holds the mobile terminal with one hand, or may be that the user holds the mobile terminal with two hands.

The non-handheld state means that the user does not hold the mobile terminal by hand. For example, the non-handheld state may be that the mobile terminal is placed on a table, and the hand of the user does not touch the mobile terminal.

The external device may be an electronic device such as a Bluetooth headset, a Bluetooth speaker, or a wired headset, and the external device needs to have a voice call function.

S202: Determine, based on the ambient light sensor, whether light luminance of an ambient environment of the mobile terminal is greater than or equal to a luminance threshold. When the light luminance of the ambient environment of the mobile terminal is greater than or equal to the luminance threshold, step S203 is performed or when the light luminance of the ambient environment of the mobile terminal is less than the luminance threshold, step S204 is performed.

The ambient light sensor is configured to identify the light luminance of the ambient environment of the mobile terminal, and a unit of the light luminance is candela/square meter (cd/m2). The luminance threshold may be preset according to an actual requirement.

If the ambient light sensor determines that the light luminance of the ambient environment of the mobile terminal is greater than or equal to the luminance threshold, it indicates that the user is in a bright environment, and it may be determined, based on the ambient light sensor, that the display is in the screen-on state or the screen-off state. If the ambient light sensor determines that the light luminance of the ambient environment of the mobile terminal is less than the luminance threshold, it indicates that the user is in a dark environment, and the display may be controlled to be in the screen-on state, so that the display illuminates the ambient environment of the user.

S203: Determine, based on the ambient light sensor, that the display is in the screen-on state or the screen-off state.

When the mobile terminal is in the handheld state, it indicates that the user may need to watch the display. Certainly, the user may not need to watch the display. When the user needs to watch the display, the user may avoid blocking the ambient light sensor as much as possible. When the ambient light sensor detects that there is no blockage within a specific distance in front of the display, the mobile terminal may enable the display to be in the screen-on state. When the user does not need to watch the display, the user may block the ambient light sensor. When the ambient light sensor detects that there is a blockage within the specific distance in front of the display, the mobile terminal can control the display to be in the screen-off state.

It should be noted that the ambient light sensor mentioned in this embodiment of this application is configured to detect the light luminance within a preset distance in front of the display, to determine whether there is a blockage in front of the display. Specifically, the ambient light sensor may be a distance sensor or a proximity sensor.

Certainly, to detect whether there is a blockage in front of the display, this is not limited to the manner of detecting the light luminance within the preset distance in front of the display, and another manner may also be used. For example, whether there is a blockage in front of the display is detected in a manner of emitting laser light. For another example, whether there is a blockage in front of the display is detected in a manner of emitting infrared. For still another example, whether there is a blockage in front of the display is detected in a manner of emitting a sound wave. In other words, the ambient light sensor mentioned in this embodiment of this application can be replaced by any sensor that can detect whether there is a blockage in front of the display.

S204: Control the display to be in the screen-on state.

S205: Control the display to be in the screen-off state.

When the mobile terminal is in the non-handheld state, it indicates that the user does not need to watch the display, so that the mobile terminal can control the display to be in the screen-off state.

In the embodiment shown in FIG. 3, when the mobile terminal is on a voice call by using the external device and the mobile terminal is in the handheld state, a display control solution is intelligently selected by determining whether the light luminance of the ambient environment of the mobile terminal is greater than or equal to the luminance threshold. When the light luminance of the ambient environment of the mobile terminal is greater than or equal to the luminance threshold, it indicates that the user is in the bright environment, and it may be determined, based on the ambient light sensor, that the display is in the screen-on state or the screen-off state. When the light luminance of the ambient environment of the mobile terminal is less than the luminance threshold, it indicates that the user is in the dark environment, and the display may be controlled to be in the screen-on state, so that the display illuminates the ambient environment of the user.

Figure 4:
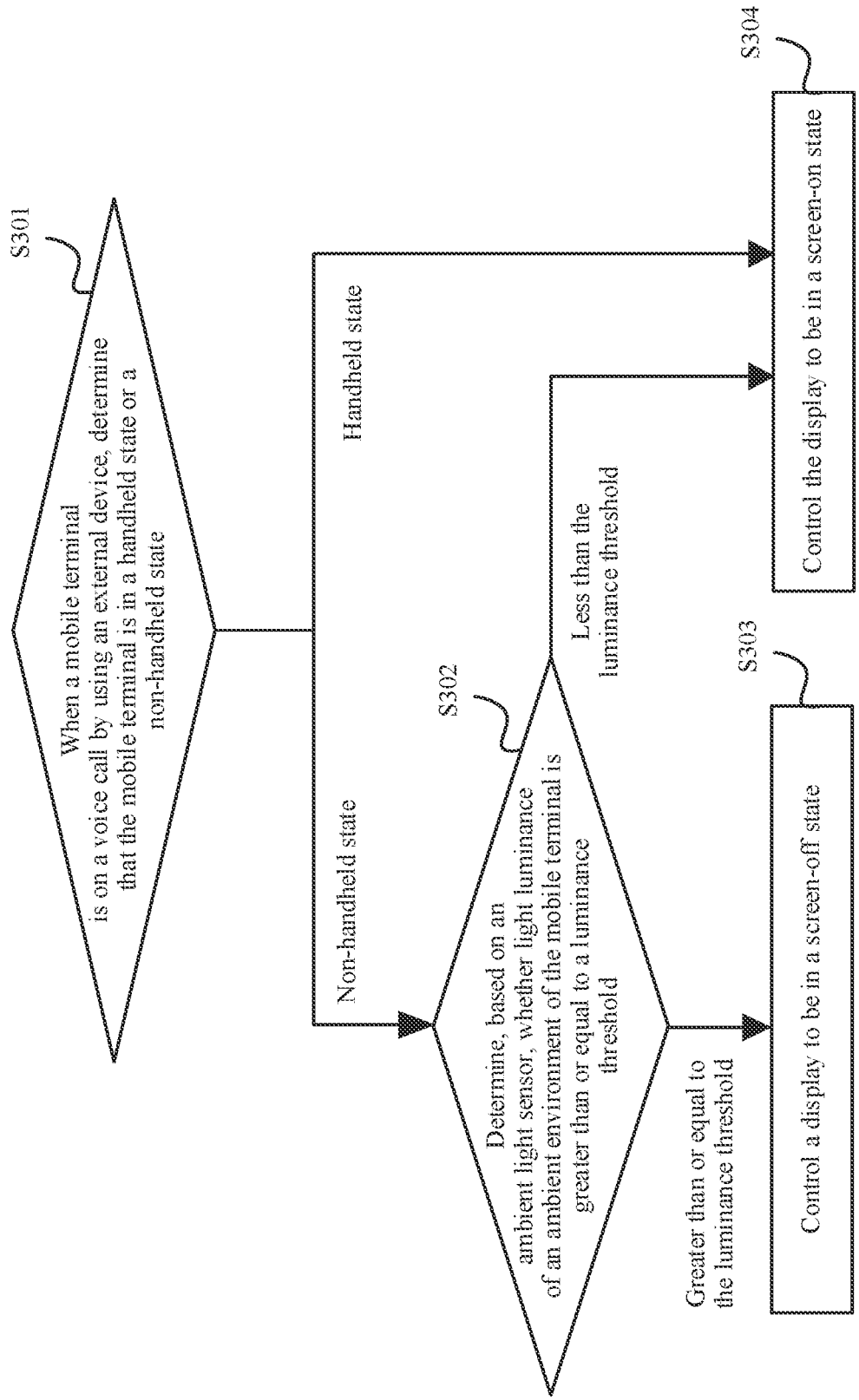
FIG. 4 is a flowchart of still another display control method according to an embodiment of this application.

Refer to FIG. 4. FIG. 4 is a flowchart of still another display control method according to an embodiment of this application. The display control method shown in FIG. 4 may be applied to a mobile terminal, the mobile terminal includes a display and an ambient light sensor, and the mobile terminal is connected to an external device. The method shown in FIG. 4 includes the following steps S301 to S304.

S301: When the mobile terminal is on a voice call by using the external device, determine that the mobile terminal is in a handheld state or a non-handheld state. If the mobile terminal is in the non-handheld state, S302 is performed; or if the mobile terminal is in the handheld state, S304 is performed.

The handheld state means that a user holds the mobile terminal by hand. For example, the handheld state may be that the user holds the mobile terminal with one hand, or may be that the user holds the mobile terminal with two hands.

The non-handheld state means that the user does not hold the mobile terminal by hand. For example, the non-handheld state may be that the mobile terminal is placed on a table, and the hand of the user does not touch the mobile terminal.

The external device may be an electronic device such as a Bluetooth headset, a Bluetooth speaker, or a wired headset, and the external device needs to have a voice call function.

S302: Determine, based on the ambient light sensor, whether light luminance of an ambient environment of the mobile terminal is greater than or equal to a luminance threshold. When the light luminance of the ambient environment of the mobile terminal is greater than or equal to the luminance threshold, step S303 is performed; or when the light luminance of the ambient environment of the mobile terminal is less than the luminance threshold, step S304 is performed.

The ambient light sensor is configured to identify the light luminance of the ambient environment of the mobile terminal, and a unit of the light luminance is candela/square meter (cd/m2). The luminance threshold may be preset according to an actual requirement.

If the ambient light sensor determines that the light luminance of the ambient environment of the mobile terminal is greater than or equal to the luminance threshold, it indicates that the user is in a bright environment, and it may be determined, based on the ambient light sensor, that the display is in the screen-on state or the screen-off state. If the ambient light sensor determines that the light luminance of the ambient environment of the mobile terminal is less than the luminance threshold, it indicates that the user is in a dark environment, and the display may be controlled to be in the screen-on state, so that the display illuminates the ambient environment of the user.

S303: Control the display to be in the screen-off state.

When the mobile terminal is in the non-handheld state and the light luminance of the ambient environment of the mobile terminal is greater than or equal to the luminance threshold, it indicates that the user does not need to watch the display, and the user is in the bright environment and does not need the display to perform illumination, so that the mobile terminal can control the display to be in the screen-off state.

S304: Control the display to be in the screen-on state.

When the mobile terminal is in the handheld state, it indicates that the user needs to watch the display, so that the mobile terminal can control the display to be in the screen-on state. Alternatively, when the luminance of light in the ambient environment of the mobile terminal is less than the luminance threshold, although the user does not need to watch the display, because the user is in the dark environment, the display may be controlled to be in the screen-on state, so that the display illuminates the ambient environment of the user.

In the embodiment shown in FIG. 4, when the mobile terminal is on a voice call by using the external device and the mobile terminal is in the non-handheld stale, a display control solution is intelligently selected by determining Whether the light luminance of the ambient environment of the mobile terminal is greater than or equal to the luminance threshold. When the light luminance of the ambient environment of the mobile terminal is greater than or equal to the luminance threshold, it indicates that the user is in the bright environment, and the user does not need the display to perform illumination. It may be determined, based on the fact that the mobile terminal is in the non-handheld state, that the user does not need to watch the display, so that the mobile terminal can control the display to be in the screen-off state. When the light luminance of the ambient environment of the mobile terminal is less than the luminance threshold, it indicates that the user is in the dark environment, and although the user does not need to watch the display, the display may be controlled to be in the screen-on state, so that the display illuminates the ambient environment of the user.

Figure 5:
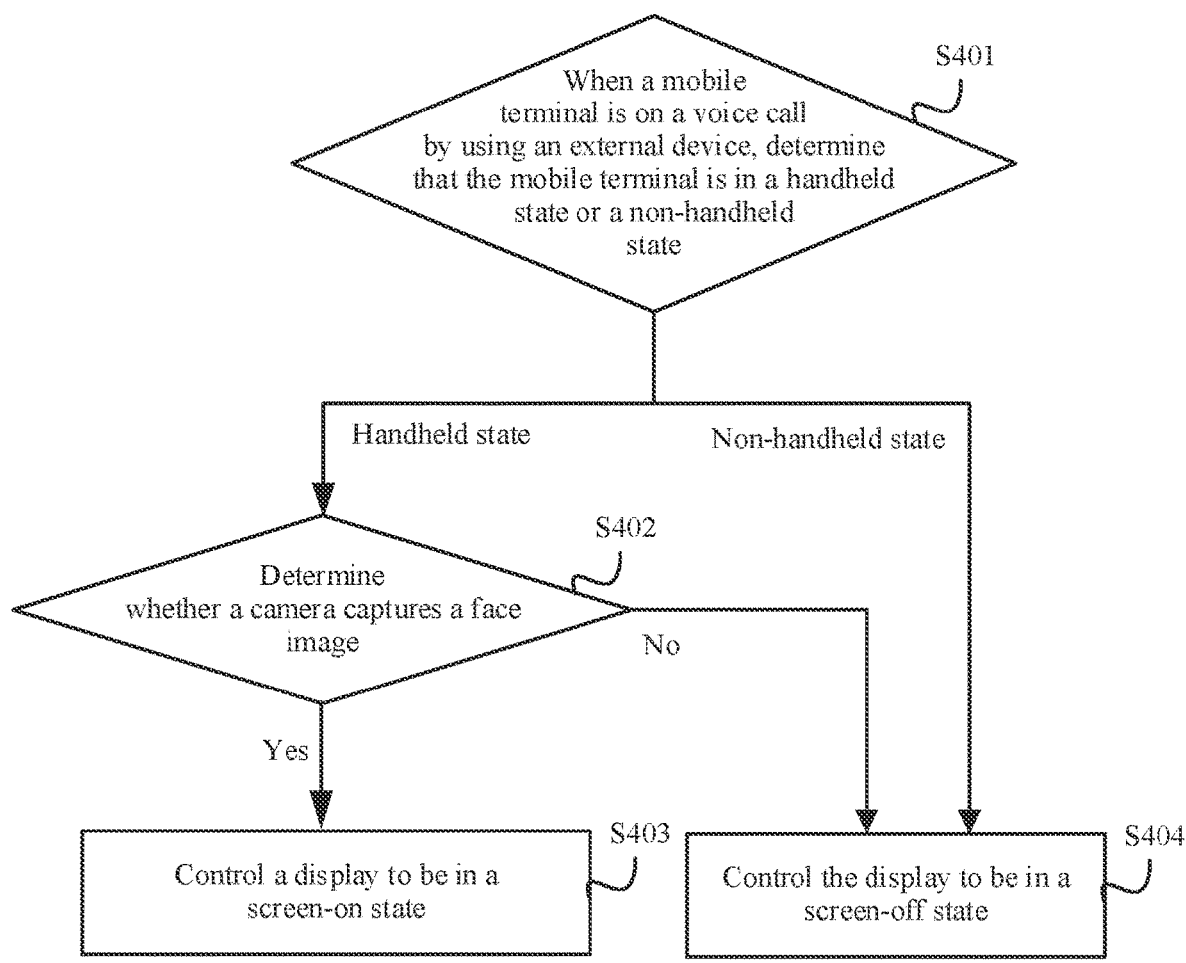
FIG. 5 is a flowchart of yet another display control method according to an embodiment of this application.

Refer to FIG. 5. FIG. 5 is a flowchart of yet another display control method according to an embodiment of this application. The display control method shown in FIG. 5 may be applied to a mobile terminal, the mobile terminal includes a display and a camera, and the mobile terminal is connected to an external device. The method shown in FIG. 5 includes the following steps S401 to S404.

S401: When the mobile terminal is on a voice call by using the external device, determine that the mobile terminal is in a handheld state or a non-handheld state. If the mobile terminal is in the handheld state, S402 is performed; or if the mobile terminal is in the non-handheld state, S404 is performed.

The handheld state means that a user holds the mobile terminal by hand. For example, the handheld state may be that the user holds the mobile terminal with one hand, or may be that the user holds the mobile terminal with two hands.

The non-handheld state means that the user does not hold the mobile terminal by hand. For example, the non-handheld state may be that the mobile terminal is placed on a table, and the hand of the user does not touch the mobile terminal.

The external device may be an electronic device such as a Bluetooth headset, a Bluetooth speaker, or a wired headset, and the external device needs to have a voice call function.

S402: Determine whether the camera captures a face image. When the camera captures the face image, step S403 is performed; or when the camera fails to capture the face image, step S404 is performed.

Optionally, the camera and the display are located on a same side of the mobile terminal. For example, it is assumed that the mobile terminal includes a front-facing camera and the display. The front-facing camera and the display are on a same side of the mobile terminal. When the front-facing camera captures the face image, it indicates that the user is watching the display of the mobile terminal. When the front-facing camera fails to capture the face image, it indicates that the user is not watching the display of the mobile terminal.

Optionally, the camera is a retractable rotary camera. For example, the mobile terminal may control the camera to be located inside the mobile terminal, or may control the camera to be located outside the mobile terminal. When the camera is located outside the mobile terminal, the camera may rotate clockwise or counterclockwise relative to the display of the mobile terminal. With reference to this embodiment of this application, the mobile terminal may control the camera to be located outside the mobile terminal, and rotate the camera to a same side as the display that is located on the mobile terminal. If the camera captures the face image, it indicates that the user is watching the display of the mobile terminal. If the camera fails to capture the face image, it indicates that the user is not watching the display of the mobile terminal.

Figure 6:
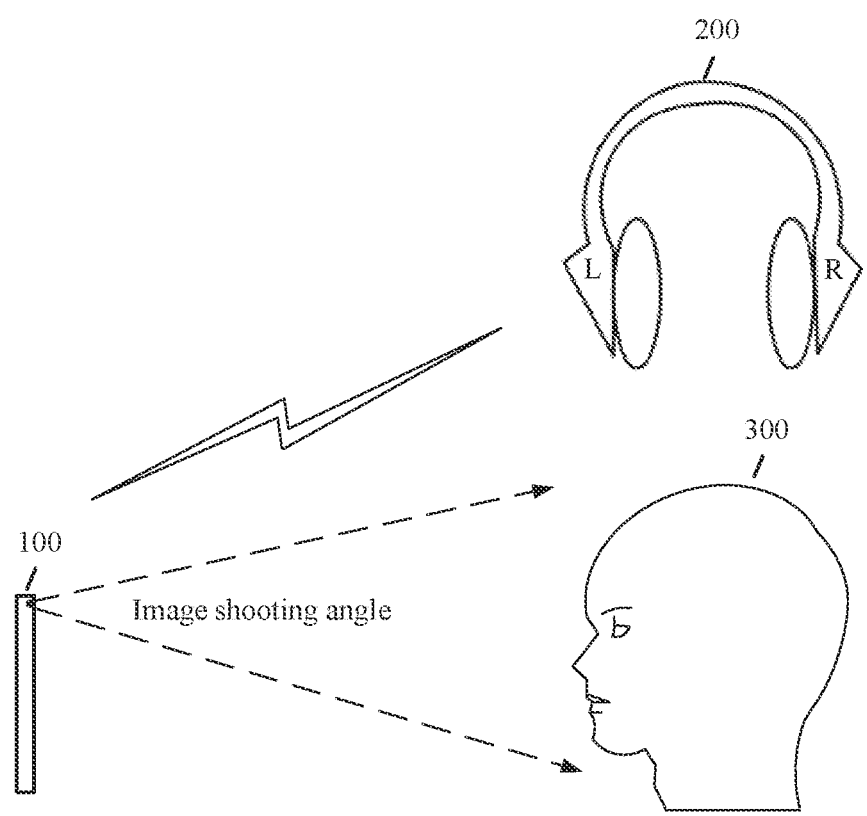
FIG. 6 is a schematic diagram of another scenario according to an embodiment of this application.

Refer to FIG. 6. FIG. 6 is a schematic diagram of another scenario according to this embodiment of this application. In FIG. 6, the mobile terminal 100 is on a voice call by using the Bluetooth headset 200, and the mobile terminal 100 may determine that the mobile terminal 100 is currently in the handheld state. A camera of the mobile terminal 100 captures a face image. In the scenario shown in FIG. 6, the camera of the mobile terminal 100 can capture a face image of the user 300, indicating that the user 300 is watching the display of the mobile terminal. In this case, the mobile terminal 100 controls the display of the mobile terminal 100 to be in the screen-on state.

Figure 7:
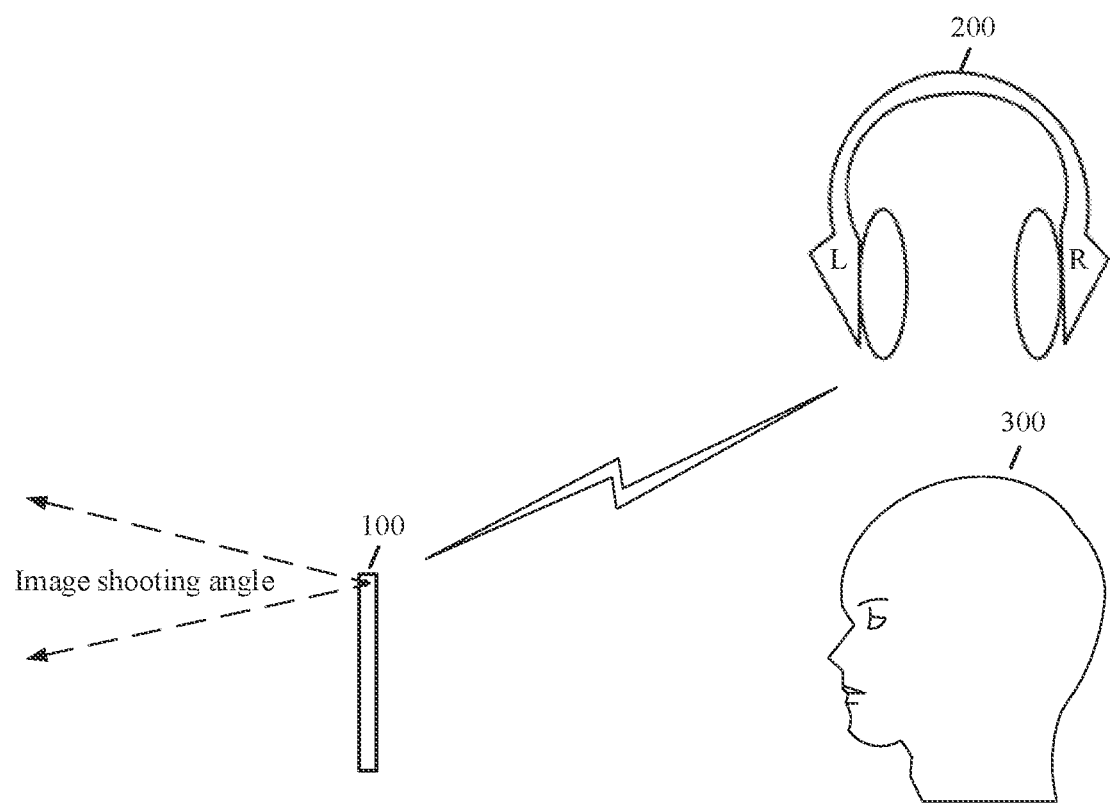
FIG. 7 is a schematic diagram of still another scenario according to an embodiment of this application.

Refer to FIG. 7. FIG. 7 is a schematic diagram of still another scenario according to this embodiment of this application. In FIG. 7, the mobile terminal 100 is on a voice call by using the Bluetooth headset 200, and the mobile terminal 100 may determine that the mobile terminal 100 is currently in the handheld state. A camera of the mobile terminal 100 captures a face image. In the scenario shown in FIG. 7, the camera of the mobile terminal 100 fails to capture the face image of the user 300, indicating that the user 300 is not watching the display of the mobile terminal. In this case, the mobile terminal 100 controls the display of the mobile terminal 100 to be in the screen-off state.

S403: Control the display to be in the screen-on state.

When the mobile terminal is in the handheld state and the camera captures the face image, it indicates that the user is watching the display, so that the mobile terminal can control the display to be in the screen-on state.

S404: Control the display to be in the screen-off state.

When the mobile terminal is in the handheld state and the camera fails to capture the face image, it indicates that the user is not watching the display, so that the mobile terminal can control the display to be in the screen-off state. Alternatively, when the mobile terminal is in the non-handheld state, it indicates that the user does not need to watch the display, so that the mobile terminal can control the display to be in the screen-off state.

In the embodiment shown in FIG. 5, when the mobile terminal is on a voice call by using the external device and the mobile terminal is in the handheld state, a display control solution is intelligently selected by determining whether the camera captures the face image, to meet requirements of the user in different scenarios.

In addition, as a solution that can replace S402, in this embodiment of this application, it is further determined, by using the camera, whether a sight line of an eyeball of the user focuses on the display of the Mobile terminal. When it is determined, by using the camera, that the sight line of the eyeball of the user focuses on the display of the mobile terminal, it indicates that the user is watching the display, and step S403 is performed, so that the mobile terminal can control the display to be in the screen-on state. When it is determined, by using the camera, that the sight line of the eyeball of the user does not focus on the display of the mobile terminal, it indicates that the user is not watching the display, and step S404 is performed, so that the mobile terminal can control the display to be in the screen-off state.

Figure 8:
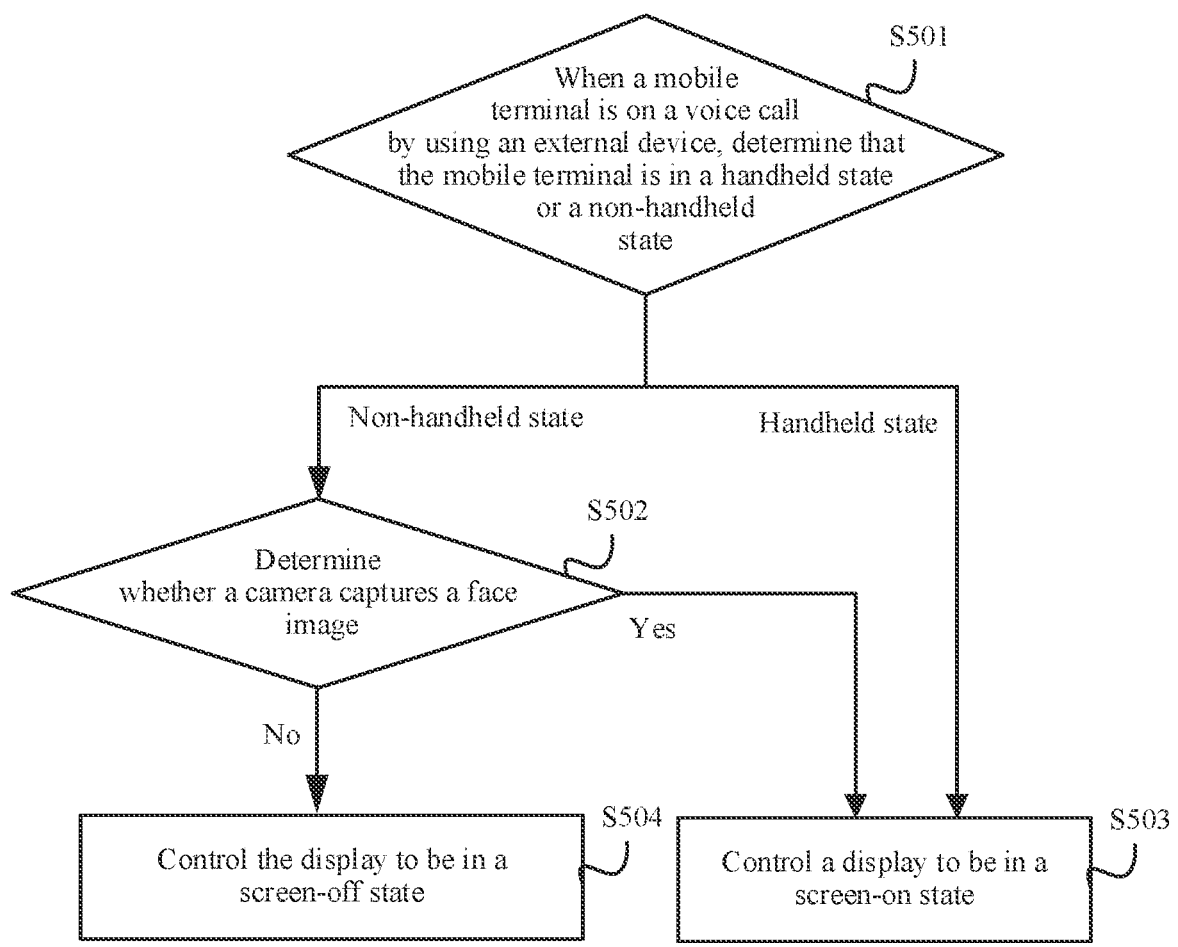
FIG. 8 is a flowchart of still yet another display control method according to an embodiment of this application.

Refer to FIG. 8. FIG. 8 is a flowchart of still yet another display control method according to an embodiment of this application. The display control method shown in FIG. 8 may be applied to a mobile terminal, the mobile terminal includes a display and a camera, and the mobile terminal is connected to an external device. The method shown in FIG. 8 includes the following steps S501 to S504.

S501: When the mobile terminal is on a voice call by using the external device, determine that the mobile terminal is in a handheld state or a non-handheld state. If the mobile terminal is in the non-handheld state, S502 is performed; or if the mobile terminal is in the handheld state, S503 is performed.

The handheld state means that a user holds the mobile terminal by hand. For example, the handheld state may be that the user holds the Mobile terminal with one hand, or may be that the user holds the mobile terminal with two hands.

The non-handheld state means that the user does not hold the mobile terminal by hand. For example, the non-handheld state may be that the mobile terminal is placed on a table, and the hand of the user does not touch the mobile terminal.

The external device may be an electronic device such as a Bluetooth headset, a Bluetooth speaker, or a wired headset, and the external device needs to have a voice call function.

S502: Determine whether the camera captures a face image. When the camera captures the face image, step S503 is performed; or when the camera fails to capture the face image, step S504 is performed.

Optionally, the camera and the display are located on a same side of the mobile terminal. For example, it is assumed that the mobile terminal includes a front-facing camera and the display. The front-facing camera and the display are on a same side of the mobile terminal. When the front-facing camera captures the face image, it indicates that the user is watching the display of the mobile terminal. When the front-facing camera fails to capture the face image, it indicates that the user is not watching the display of the mobile terminal.

Optionally, the camera is a retractable rotary camera. For example, the mobile terminal may control the camera to be located inside the mobile terminal, or may control the camera to be located outside the mobile terminal. When the camera is located outside the mobile terminal, the camera may rotate clockwise or counterclockwise relative to the display of the mobile terminal. With reference to this embodiment of this application, the mobile terminal may control the camera to be located outside the mobile terminal, and rotate the camera to a same side as the display that is located on the mobile terminal. If the camera captures the face image, it indicates that the user is watching the display of the mobile terminal. If the camera fails to capture the face image, it indicates that the user is not watching the display of the mobile terminal.

Refer to FIG. 6. The mobile terminal 100 is on a voice call by using the Bluetooth headset 200, and the mobile terminal 100 may determine that the mobile terminal 100 is currently in the non-handheld state. The camera of the mobile terminal 100 captures a face image. In the scenario shown in FIG. 6, the camera of the mobile terminal 100 can capture the face image of the user 300, indicating that the user 300 is watching the display of the mobile terminal. In this case, the mobile terminal 100 controls the display of the mobile terminal 100 to be in the screen-on state.

Refer to FIG. 7. The mobile terminal 100 is on a voice call by using the Bluetooth headset 200, and the mobile terminal 100 may determine that the mobile terminal 100 is currently in the non-handheld state. The camera of the mobile terminal 100 captures a face image. In the scenario shown in FIG. 7, the camera of the mobile terminal 100 fails to capture the face image of the user 300, indicating that the user 300 is not watching the display of the mobile terminal. In this case, the mobile terminal 100 controls the display of the mobile terminal 100 to be in the screen-off state.

S503: Control the display to be in the screen-on state.

When the mobile terminal is in the non-handheld state and the camera captures the face image, or the mobile terminal is in the handheld state, it indicates that the user is watching the display, so that the mobile terminal can control the display to be in the screen-on state.

S504: Control the display to be in the screen-off state.

When the mobile terminal is in the non-handheld state and the camera fails to capture the face image, it indicates that the user is not watching the display, so that the mobile terminal can control the display to be in the screen-off state.

In the embodiment shown in FIG. 8, when the mobile terminal is on a voice call by using the external device and the mobile terminal is in the non-handheld state, a display control solution is intelligently selected by determining whether the camera captures a face image, to meet requirements of the user in different scenarios.

In addition, as a solution that can replace S502, in this embodiment of this application, it is further determined, by using the camera, whether a sight line of an eyeball of the user focuses on the display of the mobile terminal. When it is determined, by using the camera, that the sight line of the eyeball of the user focuses on the display of the mobile terminal, it indicates that the user is watching the display, and step S503 is performed, so that the mobile terminal can control the display to be in the screen-on state. When it is determined, by using the camera, that the sight line of the eyeball of the user does not focus on the display of the mobile terminal, it indicates that the user is not watching the display, and step S504 is performed, so that the mobile terminal can control the display to be in the screen-off state.

Figure 9:
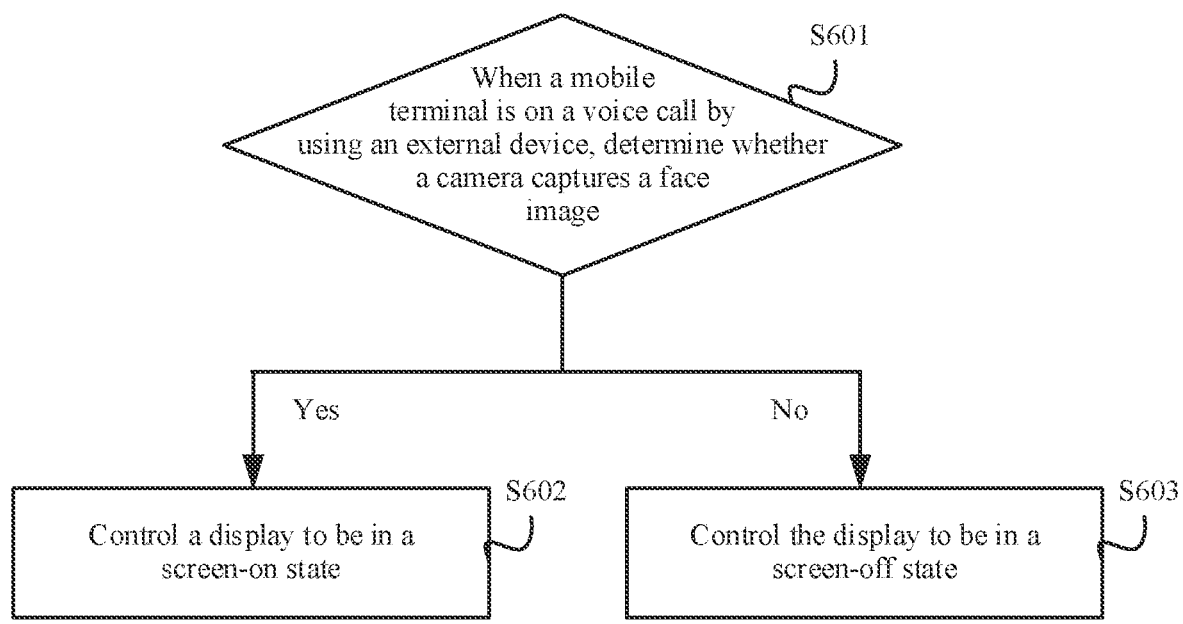
FIG. 9 is a flowchart of a further display control method according to an embodiment of this application.

Refer to FIG. 9. FIG. 9 is a flowchart of a further display control method according to an embodiment of this application. The display control method shown in FIG. 9 may be applied to a mobile terminal, the mobile terminal includes a display and a camera, and the mobile terminal is connected to an external device. The method shown in FIG. 9 includes the following steps S601 to S603.

S601: When the mobile terminal is on a voice call by using the external device, determine whether the camera captures a face image. When the camera captures the face image, step S602 is performed; or when the camera fails to capture the face image, step S603 is performed.

Optionally, the camera and the display are located on a same side of the mobile terminal. For example, it is assumed that the mobile terminal includes a front-facing camera and the display. The front-facing camera and the display are on a same side of the mobile terminal. When the front-facing camera captures a face image, it indicates that the user is watching the display of the mobile terminal. When the front-facing camera fails to capture a face image, it indicates that the user is not watching the display of the mobile terminal.

Optionally, the camera is a retractable rotary camera. For example, the mobile terminal may control the camera to be located inside the mobile terminal, or may control the camera to be located outside the mobile terminal. When the camera is located outside the mobile terminal, the camera may rotate clockwise or counterclockwise relative to the display of the mobile terminal. With reference to this embodiment of this application, the mobile terminal may control the camera to be located outside the mobile terminal, and rotate the camera to a same side as the display that is located on the mobile terminal. If the camera captures the face image, it indicates that the user is watching the display of the mobile terminal. If the camera fails to capture the face image, it indicates that the user is not watching the display of the mobile terminal.

Refer to FIG. 6. The mobile terminal 100 is on a voice call by using the Bluetooth headset 200. The camera of the mobile terminal 100 captures a face image. In the scenario shown in FIG. 6, the camera of the mobile terminal 100 can capture the face image of the user 300, indicating that the user 300 is watching the display of the mobile terminal. In this case, the mobile terminal 100 controls the display of the mobile terminal 100 to be in the screen-on state.

Refer to FIG. 7. The mobile terminal 100 is on a voice call by using the Bluetooth headset 200. The camera of the mobile terminal 100 captures a face image. In the scenario shown in FIG. 7, the camera of the mobile terminal 100 fails to capture the face image of the user 300, indicating that the user 300 is not watching the display of the mobile terminal. In this case, the mobile terminal 100 controls the display of the mobile terminal 100 to be in the screen-off state.

S602: Control the display to be in the screen-on state.

When the camera of the mobile terminal captures the face image, it indicates that the user is watching the display, so that the mobile terminal can control the display to be in the screen-on state.

S603: Control the display to be in the screen-off state.

When the camera of the mobile terminal fails to capture the face image, it indicates that the user is not watching the display, so that the mobile terminal can control the display to be in the screen-off state.

In the embodiment shown in FIG. 9, when the mobile terminal is on a voice call by using the external device, a display control solution is intelligently selected by determining whether the camera captures a face image, to meet requirements of the user in different scenarios.

In addition, as a solution that can replace S602, in this embodiment of this application, it is further determined, by using the camera, whether a sight line of an eyeball of the user focuses on the display of the Mobile terminal. When it is determined, by using the camera, that the sight line of the eyeball of the user focuses on the display of the mobile terminal, it indicates that the user is watching the display, and step S602 is performed, so that the mobile terminal can control the display to be in the screen-on state. When it is determined, by using the camera, that the sight line of the eyeball of the user does not focus on the display of the mobile terminal, it indicates that the user is not watching the display, and step S603 is performed, so that the mobile terminal can control the display to be in the screen-off state.

Optionally, before S602, if the mobile terminal further includes an ambient light sensor, the embodiment shown in FIG. 9 may further include the following steps: determining, based on the ambient light sensor, whether light luminance of an ambient environment of the mobile terminal is greater than or equal to a luminance threshold; and when the light luminance of the ambient environment of the mobile terminal is greater than or equal to the luminance threshold, determining, based on the ambient light sensor, that the display is in the screen-on state or the screen-off state, or when the light luminance of the ambient environment of the mobile terminal is less than the luminance threshold, performing step S602.

When the mobile terminal is on a voice call by using the external device, the display control solution is intelligently selected based on whether the camera captures a face image and by determining whether the light luminance of the ambient environment of the mobile terminal is greater than or equal to the luminance threshold. When the camera captures the face image and the light luminance of the ambient environment of the mobile terminal is greater than or equal to the luminance threshold, it indicates that the user is watching the display and the user is in a bright environment. Although the user does not need the display to perform illumination, the user needs to watch the display. In this case, it is determined, based on the ambient light sensor, that the display is in the screen-on state or the screen-off state. When the camera captures the face image and the light luminance of the ambient environment of the mobile terminal is less than the luminance threshold, it indicates that the user is watching the display and the user is in a dark environment. Therefore, the user needs the display to perform illumination, and the user needs to watch the display. In this case, the display is controlled to be in the screen-on state.

Optionally, before S603, if the mobile terminal further includes an ambient light sensor, the embodiment shown in FIG. 9 may further include the following steps: determining, based on the ambient light sensor, whether light luminance of an ambient environment of the mobile terminal is greater than or equal to a luminance threshold; and when the light luminance of the ambient environment of the mobile terminal is greater than or equal to the luminance threshold, performing S603; or when the light luminance of the ambient environment of the mobile terminal is less than the luminance threshold, performing step S602.

When the mobile terminal is on a voice call by using the external device, the display control solution is intelligently selected based on whether the camera captures a face image and by determining whether the light luminance of the ambient environment of the mobile terminal is greater than or equal to the luminance threshold. When the camera fails to capture the face image and the light luminance of the ambient environment of the mobile terminal is greater than or equal to the luminance threshold, it indicates that the user is not watching the display and the user is in a bright environment, that is, the user does not need the display to perform illumination and does not need to watch the display. In this case, the display is controlled to be in the screen-off state. When the camera fails to capture the face image and the light luminance of the ambient environment of the mobile terminal is less than the luminance threshold, it indicates that the user is not watching the display and the user is in a dark environment. Although the user needs to watch the display, the user needs the display to perform illumination. Therefore, the display is controlled to be in the screen-on state.

Figure 10:
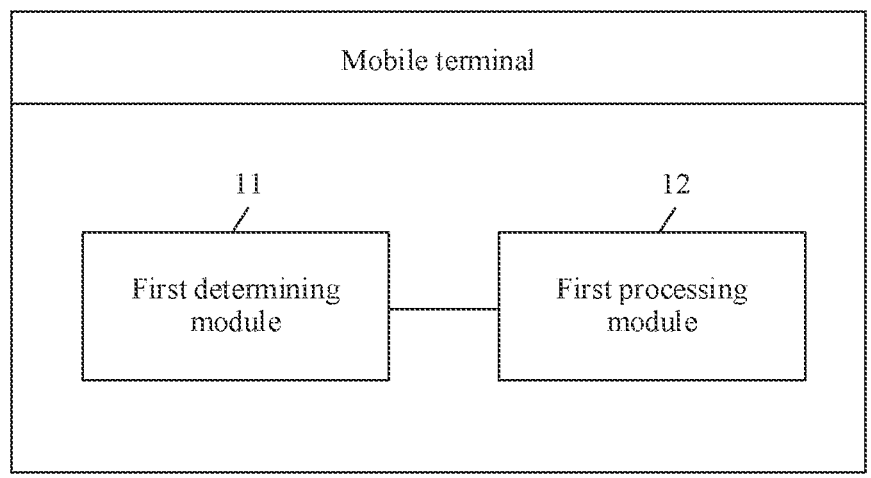
FIG. 10 is a schematic diagram of a mobile terminal according to an embodiment of this application.

Refer to FIG. 10. FIG. 10 is a schematic diagram of a mobile terminal according to an embodiment of this application. The mobile terminal shown in FIG. 10 includes the following modules:

a first determining module 11, configured to: when the mobile terminal is on a voice call by using an external device, determine that the mobile terminal is in a handheld state or a non-handheld state; and a first processing module 12, configured to: when the mobile terminal is in the handheld state, control the display to be in a screen-on state; or when the mobile terminal is in the non-handheld state, control the display to be in a screen-off state.

For additional functions that can be implemented by the first determining module 11 and the first processing module 12 and more details of implementing the foregoing functions, refer to the descriptions in the foregoing method embodiments. Details are not repeated herein.

Figure 11:
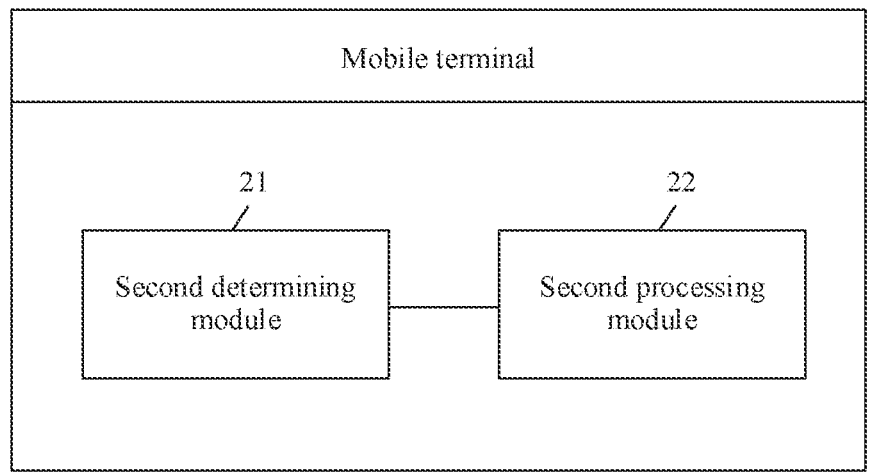
FIG. 11 is a schematic diagram of another mobile terminal according to an embodiment of this application.

Refer to FIG. 11. FIG. 11 is a schematic diagram of another mobile terminal according to an embodiment of this application. The mobile terminal shown in FIG. 10 includes the following modules:

a second determining module 21, configured to: when the mobile terminal is on a voice call by using an external device, determine whether a camera captures a face image; and a second processing module 22, configured to: when the camera captures the face image, control the display to be in a screen-on state; or when the camera fails to capture the face image, control the display to be in a screen-off state.

For additional functions that can be implemented by the second determining module 21 and the second processing module 22 and more details of implementing the foregoing functions, refer to the descriptions in the foregoing method embodiments. Details are not repeated herein.

The apparatus embodiments described in FIG. 10 and FIG. 11 are merely examples. For example, module division is merely logical function division, and may be other division during actual implementation. For example, a plurality of modules or components may be combined or integrated into another system or some features may be ignored or not performed. Function modules in embodiments of this application may be integrated into one processing module, or each module may exist alone physically, or two or more modules may be integrated into one module.

Figure 12:
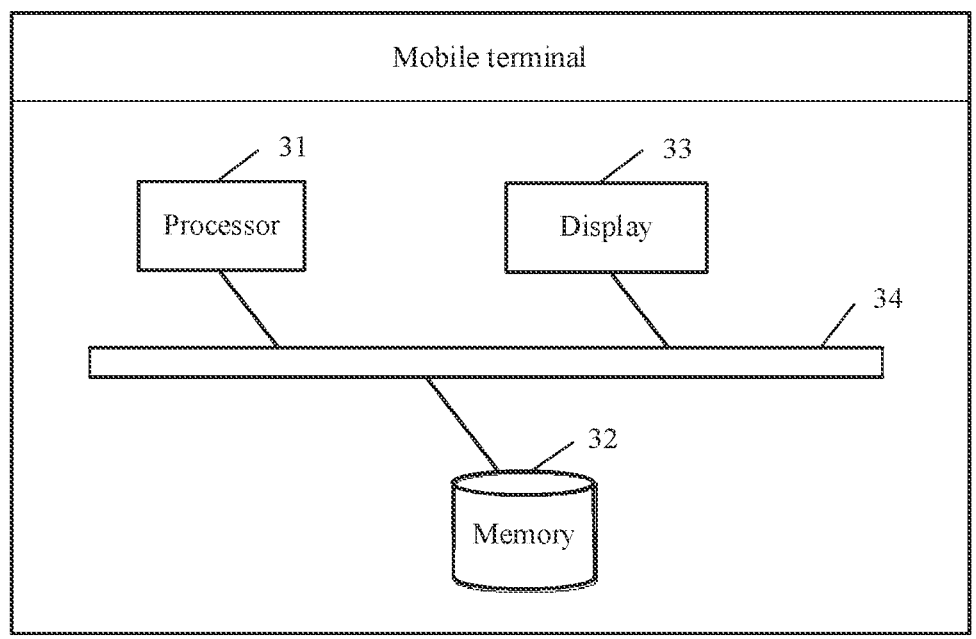
FIG. 12 is a schematic diagram of still another mobile terminal according to an embodiment of this application.

Refer to FIG. 12. FIG. 12 is a schematic diagram of still another mobile terminal according to an embodiment of this application. The mobile terminal shown in FIG. 12 includes a processor 31, a memory 32, and a display 33. The mobile terminal is connected to an external device.

In the embodiment shown in FIG. 12, the processor 31 is configured to execute instructions stored in the memory 32, so that the mobile terminal performs the following operations: when the mobile terminal is on a voice call by using the external device, determining that the mobile terminal is in a handheld state or a non-handheld state; and when the mobile terminal is in the handheld state, controlling the display to be in a screen-on state; or when the mobile terminal is in the non-handheld state, controlling the display to be in a screen-off state.

The processor 31 may be one or more CPUs. Optionally, the CPU is a single-core CPU or a multi-core CPU.

The memory 32 includes but is not limited to a random access memory (random access memory, RAM), a read-only memory (Read-only Memory, ROM), and an erasable programmable read-only memory (erasable programmable read-only memory, EPROM), a flash memory, or an optical memory. The memory 32 stores code of an operating system.

Optionally; the mobile terminal further includes a bus 34. The processor 31, the memory 32, and the display 33 are connected to each other through a bus 34, or may be connected to each other in another manner.

Embodiments in this specification are all described in a progressive manner, for same or similar parts in embodiments, refer to these embodiments, and each embodiment focuses on a difference from other embodiments. Especially, a system embodiment is basically similar to a method embodiment, and therefore is described briefly. For related parts, refer to partial descriptions in the method embodiment.

Obviously, persons skilled in the art can make various modifications and variations to the present invention without departing from the scope of the present invention. The present invention is intended to cover these modifications and variations provided that the modifications and variations in this application fall within the scope of the claims of the present invention.

What is claimed is:

1. A display control method implemented by a mobile terminal, wherein the display control method comprises:
   detecting, when the mobile terminal is on a voice call using a connection to an external device, that the mobile terminal is in a handheld state or a non-handheld state;
   detecting, by an ambient light sensor of the mobile terminal, that a light luminance of an ambient environment of the mobile terminal is less than or equal to a luminance threshold;
   controlling a display of the mobile terminal to be in a screen-on state when the mobile terminal is in the handheld state and when the light luminance is less than or equal to the luminance threshold; and
   controlling the display to be in a screen-off state when the light luminance is greater than or equal to the luminance threshold.

2. The display control method of claim 1, further comprising:
   detecting, by a capacitance sensor of the display, whether the display is touched;
   detecting that the mobile terminal is in the handheld state when the display is touched; and
   detecting that the mobile terminal is in the non-handheld state when the display is not touched.

3. The display control method of claim 1, further comprising:
   collecting, by a temperature sensor of the mobile terminal, a skin temperature of a human body in contact with the mobile terminal;
   detecting that the mobile terminal is in the handheld state when a temperature value of the temperature sensor is within a first temperature range; and
   detecting that the mobile terminal is in the non-handheld state when the temperature value is outside the first temperature range.

4. The display control method of claim 1, further comprising further detecting, based on an acceleration sensor of the mobile terminal, whether the mobile terminal is in the handheld state or the non-handheld state.

5. The display control method of claim 4, further comprising:
  detecting a motion parameter of the acceleration sensor during a first time period;
  further detecting that the mobile terminal is in the handheld state when the motion parameter conforms to a handheld condition; and
  further detecting that the mobile terminal is in the non-handheld state when the motion parameter does not conform to the handheld condition.

6. The display control method of claim 2, wherein before controlling the display to be in the screen-on state or a screen-off state, the display control method further comprises:
  detecting that a camera of the mobile terminal captures a face image;
  further controlling the display to be in the screen-on state when the camera captures the face image; and
  further controlling the display to be in the screen-off state when the camera fails to capture the face image.

7. The display control method of claim 1, further comprising controlling the display to be in the screen-off state when the ambient light sensor detects that there is a blockage within a predetermined distance in front of the display.

8. The display control method of claim 1, further comprising controlling the display to be in the screen-on state when the ambient light sensor detects that there is no blockage within a predetermined distance in front of the display.

9. The display control method of claim 1, further comprising:
  collecting, by a temperature sensor of the mobile terminal, a shell temperature of a human body in contact with the mobile terminal;
  detecting that the mobile terminal is in the handheld state when a temperature value of the temperature sensor is within a first temperature range; and
  detecting that the mobile terminal is in the non-handheld state when the temperature value is outside the first temperature range.

10. A display control method implemented by a mobile terminal, wherein the display control method comprises:
  detecting, when the mobile terminal is on a voice call using a connection to an external device, that a camera of the mobile terminal captures a face image;
  detecting, by an ambient light sensor of the mobile terminal, that a light luminance of an ambient environment of the mobile terminal is less than or equal to a luminance threshold;
  controlling a display of the mobile terminal to be in a screen-on state when the camera captures the face image and when the light luminance is less than or equal to the luminance threshold; and
  controlling the display to be in a screen-off state when the light luminance is greater than or equal to the luminance threshold.

11. A mobile terminal comprising:
  a display; and
  a processor coupled to the display and configured to:
  detect, when the mobile terminal is on a voice call using a connection to an external device, that the mobile terminal is in a handheld state or a non-handheld state;
  detect, by an ambient light sensor of the mobile terminal, that a light luminance of an ambient environment of the mobile terminal is less than or equal to a luminance threshold;
  control the display to be in a screen-on state when the mobile terminal is in the handheld state and when the light luminance is less than or equal to the luminance threshold; and
  control the display to be in a screen-off state when the light luminance is greater than or equal to the luminance threshold.

12. The mobile terminal of claim 11, wherein the display comprises a capacitance sensor, and wherein the processor is further configured to:
  detect, using the capacitance sensor, whether the display is touched;
  detect that the mobile terminal is in the handheld state when the display is touched; and
  detect that the mobile terminal is in the non-handheld state when the display is not touched.

13. The mobile terminal of claim 11, further comprising a temperature sensor coupled to the processor, wherein the processor is further configured to:
  collect, using the temperature sensor, a skin temperature of a human body in contact with the mobile terminal;
  detect that the mobile terminal is in the handheld state when a temperature value of the temperature sensor is within a first temperature range; and
  detect that the mobile terminal is in the non-handheld state when the temperature value is outside the first temperature range.

14. The mobile terminal of claim 11, further comprising an acceleration sensor coupled to the processor, wherein the processor is further configured to further detect, based on the acceleration sensor, that the mobile terminal is in the handheld state or the non-handheld state.

15. The mobile terminal of claim 14, wherein the processor is further configured to:
  detect a motion parameter of the acceleration sensor during a first time period;
  further detect that the mobile terminal is in the handheld state when the motion parameter conforms to a handheld condition; and
  further detect that the mobile terminal is in the non-handheld state when the motion parameter does not conform to a handheld condition.

16. The mobile terminal of claim 12, further comprising a camera coupled to the processor, and wherein the processor is further configured to:
  detect that the camera captures a face image; and
  further control the display to be in a screen-on state when the camera captures the face image.

17. The mobile terminal of claim 12, further comprising a camera coupled to the processor, and wherein the processor is further configured to:
  detect that the camera captures a face image; and
  further control the display to be in the screen-off state when the camera fails to capture the face image.

18. The mobile terminal of claim 11, further comprising an ambient light sensor coupled to the processor, wherein the processor is further configured to control the display to be in the screen-off state when the ambient light sensor detects that there is a blockage within a predetermined distance in front of the display.

19. The mobile terminal of claim 11, further comprising an ambient light sensor coupled to the processor, wherein the processor is further configured to control the display to be in the screen-on state when the ambient light sensor detects that there is no blockage within a predetermined distance in front of the display.

20. The mobile terminal of claim 11, further comprising a temperature sensor, wherein the processor is further configured to:
- collect, using the temperature sensor, a shell temperature of a human body in contact with the mobile terminal;
- detect that the mobile terminal is in the handheld state when a temperature value of the temperature sensor is within a first temperature range; and
- detect that the mobile terminal is in the non-handheld state when the temperature value is outside the first temperature range.

* * * * *